(12) United States Patent
Patil et al.

(10) Patent No.: US 9,826,460 B2
(45) Date of Patent: Nov. 21, 2017

(54) MEASUREMENT OF D2D CHANNELS

(71) Applicant: QUALCOMM Incorporated, San Diego, CA (US)

(72) Inventors: Shailesh Patil, Raritan, NJ (US); Saurabha Rangrao Tavildar, Jersey City, NJ (US); Sudhir Kumar Baghel, Bridgewater, NJ (US); Kapil Gulati, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/093,483

(22) Filed: Apr. 7, 2016

(65) Prior Publication Data

US 2016/0337935 A1 Nov. 17, 2016

Related U.S. Application Data

(60) Provisional application No. 62/161,860, filed on May 14, 2015.

(51) Int. Cl.
  *H04B 7/00* (2006.01)
  *H04W 40/22* (2009.01)
  (Continued)

(52) U.S. Cl.
  CPC .......... *H04W 40/22* (2013.01); *H04L 5/0048* (2013.01); *H04W 4/02* (2013.01); *H04W 8/005* (2013.01); *H04W 24/08* (2013.01); *H04W 72/0426* (2013.01); *H04W 76/023* (2013.01); *H04W 88/04* (2013.01)

(58) Field of Classification Search
  USPC ................ 455/9, 436–455, 550.1, 41.1–41.3
  See application file for complete search history.

(56) References Cited

U.S. PATENT DOCUMENTS

2006/0274778 A1* 12/2006 Currivan ................. H04L 12/44
  370/445
2010/0177713 A1* 7/2010 Yoshii ................... H04L 1/0027
  370/329

(Continued)

OTHER PUBLICATIONS

International Search Report and Written Opinion—PCT/US2016/026802—ISA/EPO—dated Jul. 18, 2016.

(Continued)

*Primary Examiner* — Fayyaz Alam
(74) *Attorney, Agent, or Firm* — Arent Fox, LLP

(57) ABSTRACT

An efficient approach for a mobile device apparatus that is out of network coverage to communicate with the network is desired. The apparatus may be a user equipment (UE). The apparatus receives one or more device-to-device (D2D) signals respectively from one or more proximate UEs. The apparatus measures signal strength of the one or more D2D signals based on signal strength of one or more resource elements used for receiving one and/or more reference signals of the one or more D2D signals or signal strength of one or more resource elements used for receiving one or more data parts of the one or more D2D signals. The apparatus selects one of the one or more proximate UEs as a relay UE based on the measurement of the signal strength of the one or more D2D signals, to communicate with the base station via the selected relay UE.

30 Claims, 9 Drawing Sheets

(51) Int. Cl.
  *H04L 5/00* (2006.01)
  *H04W 24/08* (2009.01)
  *H04W 4/02* (2009.01)
  *H04W 8/00* (2009.01)
  *H04W 72/04* (2009.01)
  *H04W 76/02* (2009.01)
  *H04W 88/04* (2009.01)

(56) References Cited

U.S. PATENT DOCUMENTS

| | | | | |
|---|---|---|---|---|
| 2010/0220608 A1* | 9/2010 | Skillermark | ......... | H04B 7/0417 370/252 |
| 2015/0215764 A1* | 7/2015 | Tavildar | ................ | H04W 48/08 370/254 |
| 2016/0128053 A1* | 5/2016 | Wei | ...................... | H04W 8/005 455/450 |
| 2016/0149660 A1* | 5/2016 | Seo | .................. | H04W 56/0015 370/336 |
| 2016/0174179 A1* | 6/2016 | Seo | .................... | H04W 76/023 370/350 |
| 2016/0212721 A1* | 7/2016 | Sheng | .................. | H04W 48/16 |
| 2016/0219640 A1* | 7/2016 | Jung | .................... | H04W 72/02 |

OTHER PUBLICATIONS

LG Electronics: "Discussion on Synchronization and Discovery Enhancements for UE-to-Network Relay", 3GPP Draft; R1-151508 Discussion on Synchronization and Discovery Enhancements for UE-to-Network Relay LG, 3rd Generation Partnership Project (3GPP), Mobile Competence Centre; 650, Route Des Lucioles vol. RAN WG1, No. Belgrade, Serbia; Apr. 20, 2015-Apr. 24, 2015 Apr. 19, 2015 (Apr. 19, 2015), XP050934380, Retrieved from the Internet: URL:http://www.3gpp.org/ftp/Meetings_3GPP SYNC/ RAN1/Docs/ [retrieved on Apr. 19, 2015].

Qualcomm Incorporated: "TP for D2D for TS 36.300", 3GPP Draft; R1-143678-TP-TS-36-300, 3rd Generation Partnership Project (3GPP), Mobile Competence Centre; 650, Route Des Lucioles; F-06921 Sophia-Antipolis Cedex; France vol. RAN WG1, No. Dresden, Germany; Aug. 18, 2014-Aug. 22, 2014 Oct. 5, 2014 (Oct. 5, 2014), XP050885117, Retrieved from the Internet: URL: http:// www.3gpp.org/ftp/tsg_ran/WG1_RL 1/TSGR1_78/Docs/ [retrieved on Oct. 5, 2014].

* cited by examiner

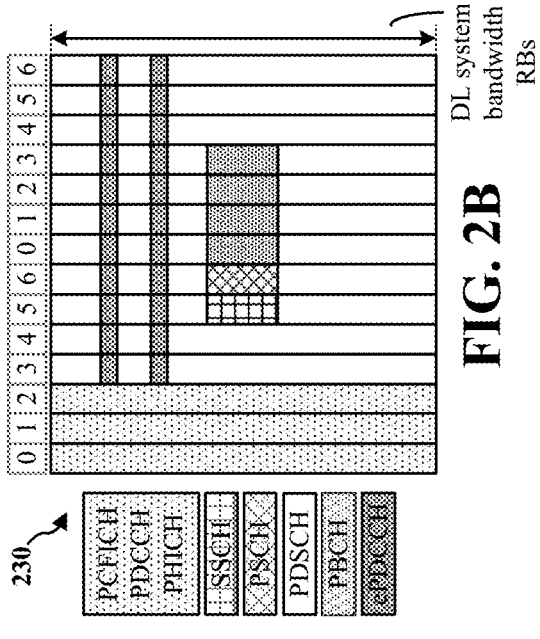
FIG. 2B
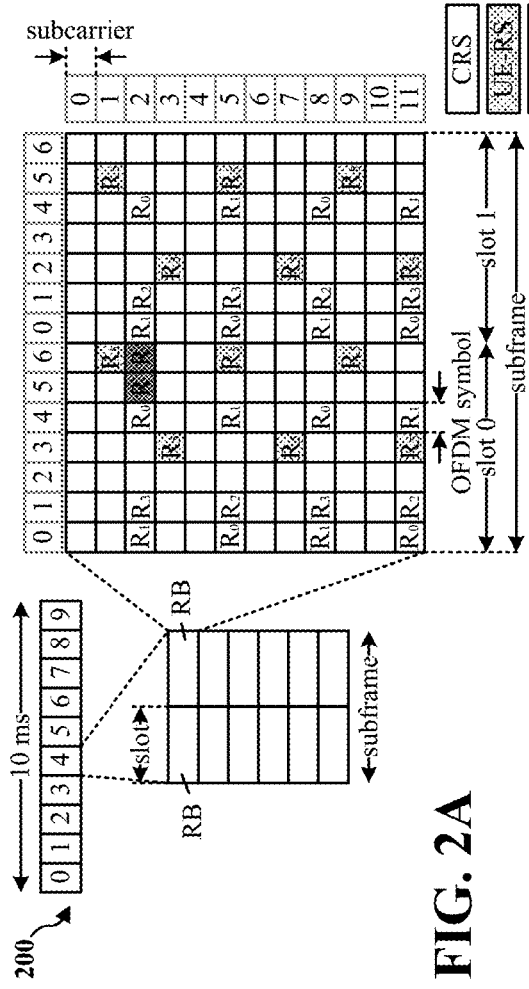
FIG. 2A
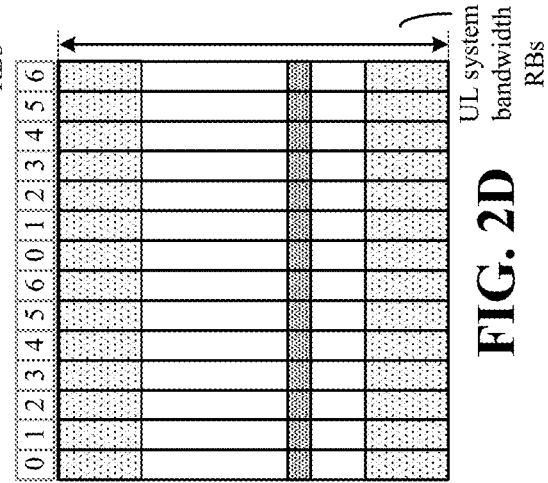
FIG. 2D
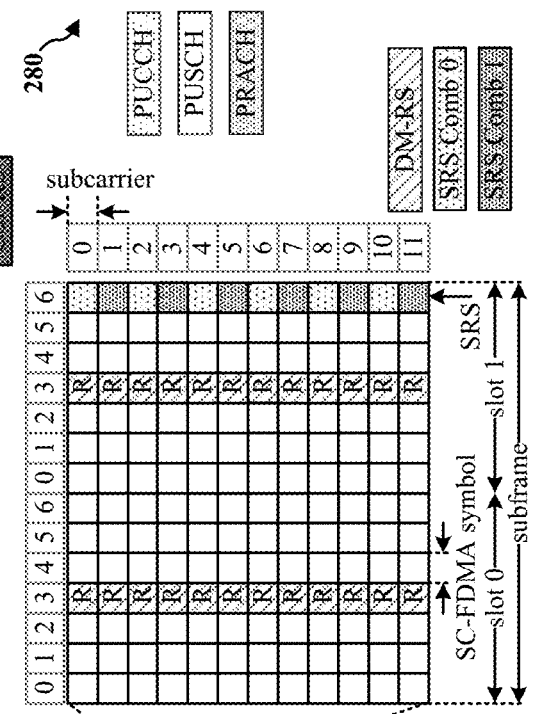
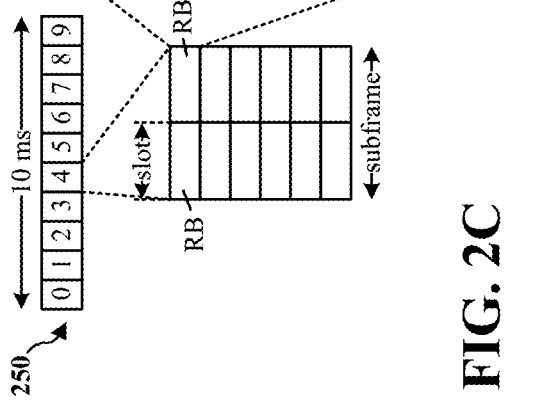
FIG. 2C

MEASUREMENT OF D2D CHANNELS

CROSS-REFERENCE TO RELATED APPLICATION(S)

This application claims the benefit of U.S. Provisional Application Ser. No. 62/161,860, entitled "MEASUREMENT OF D2D CHANNELS" and filed on May 14, 2015, which is expressly incorporated by reference herein in its entirety.

BACKGROUND

Field

The present disclosure relates generally to communication systems, and more particularly, to device-to-device communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Mobile devices may be out of network coverage, and thus may not be able to communicate with the network. However, a mobile device that is out of network coverage may still want to communicate with the network. Therefore, an approach for a mobile device out of network to communicate with the network is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) that is out of network coverage generally has weak or no connection to the network. Thus, an approach for the UE that is out of network coverage to effectively communicate with the network is desired. The UE that is out of network coverage may communicate with the network via a relay UE that is within the network coverage. If there are multiple candidate UEs as a relay UE, the UE may measure the signal strength of device-to-device signals with the multiple candidate UEs, and select one of the multiple candidate UEs as a relay UE based on the signal strength of device-to-device signals.

In an aspect of the disclosure, a method, a computer-readable medium, and an apparatus are provided. The apparatus may be a UE. The apparatus receives one or more device-to-device (D2D) signals respectively from one or more proximate UEs. The apparatus measures signal strength of the one or more D2D signals based, at least in part, on at least one of signal strength of one or more resource elements used for receiving one or more reference signals of the one or more D2D signals or signal strength of one or more resource elements used for receiving one or more data parts of the one or more D2D signals.

In another aspect, the apparatus may be a UE. The apparatus includes means for receiving one or more D2D signals respectively from one or more proximate UEs. The apparatus includes means for measuring signal strength of the one or more D2D signals based, at least in part, on at least one of signal strength of one or more resource elements used for receiving one or more reference signals of the one or more D2D signals or signal strength of one or more resource elements used for receiving one or more data parts of the one or more D2D signals.

In another aspect, the apparatus may be a UE including a memory and at least one processor coupled to the memory. The at least one processor is configured to: receive one or more D2D signals respectively from one or more proximate UEs, and measure signal strength of the one or more D2D signals based, at least in part, on at least one of signal strength of one or more resource elements used for receiving one or more reference signals of the one or more D2D signals or signal strength of one or more resource elements used for receiving one or more data parts of the one or more D2D signals.

In another aspect, a computer-readable medium storing computer executable code for wireless communication includes code to: receive one or more D2D signals respectively from one or more proximate UEs, and measure signal strength of the one or more D2D signals based, at least in part, on at least one of signal strength of one or more resource elements used for receiving one or more reference signals of the one or more D2D signals or signal strength of one or more resource elements used for receiving one or more data parts of the one or more D2D signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
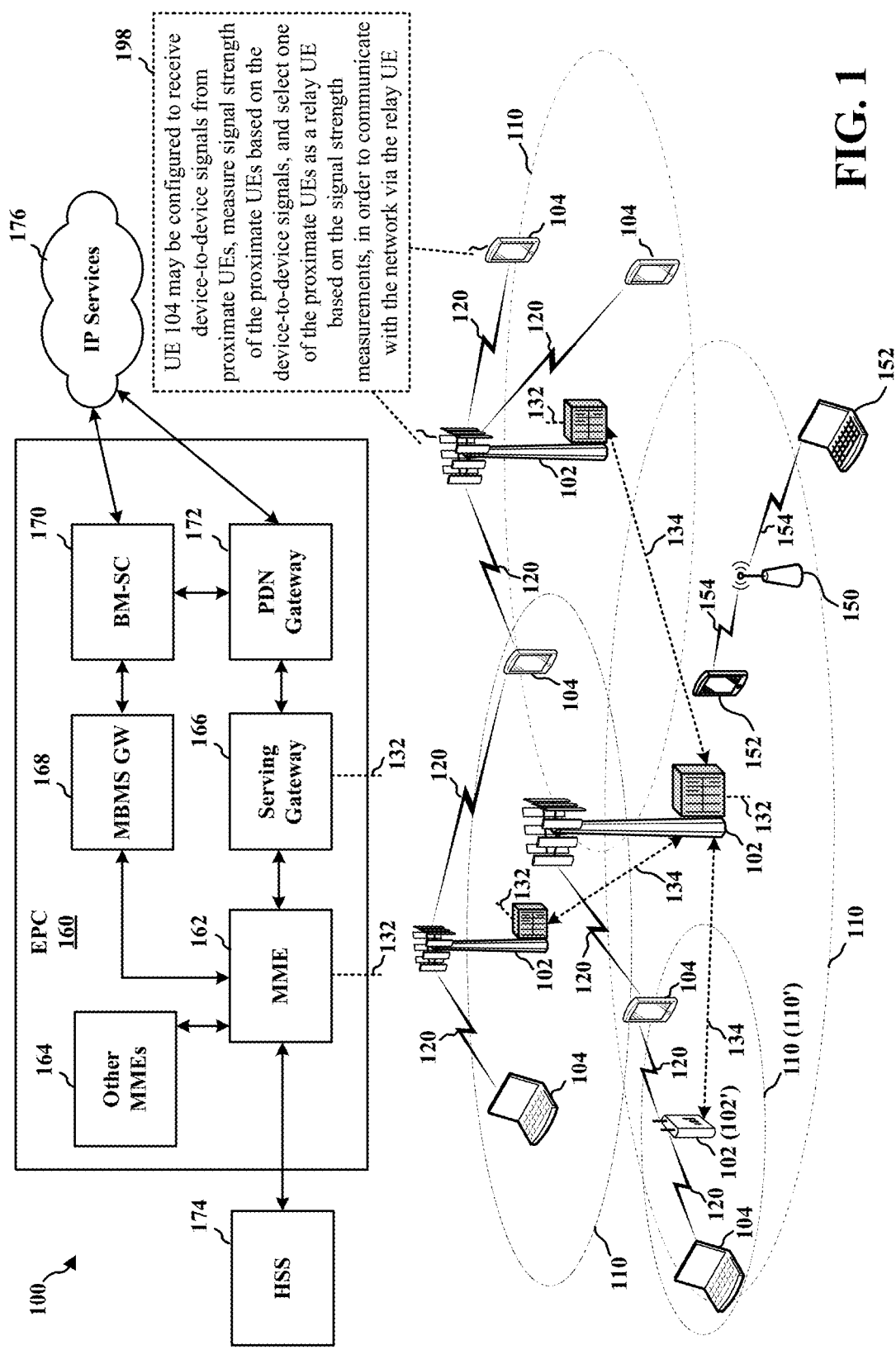
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive device-to-device signals from proximate UEs, measure signal strength of the proximate UEs based on the device-to-device signals, and select one of the proximate UEs as a relay UE based on the signal strength measurements, in order to communicate with the network via the relay UE (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
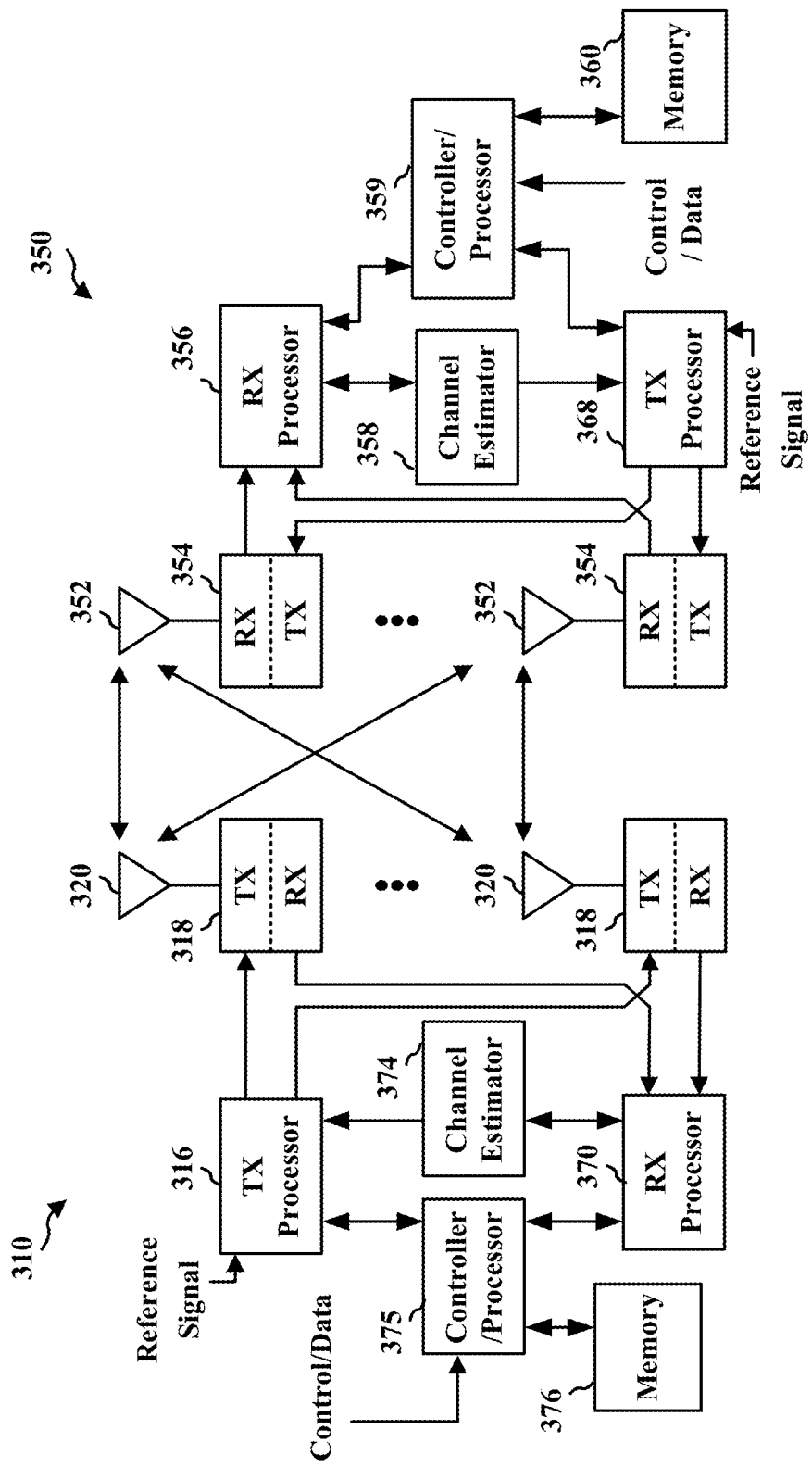
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
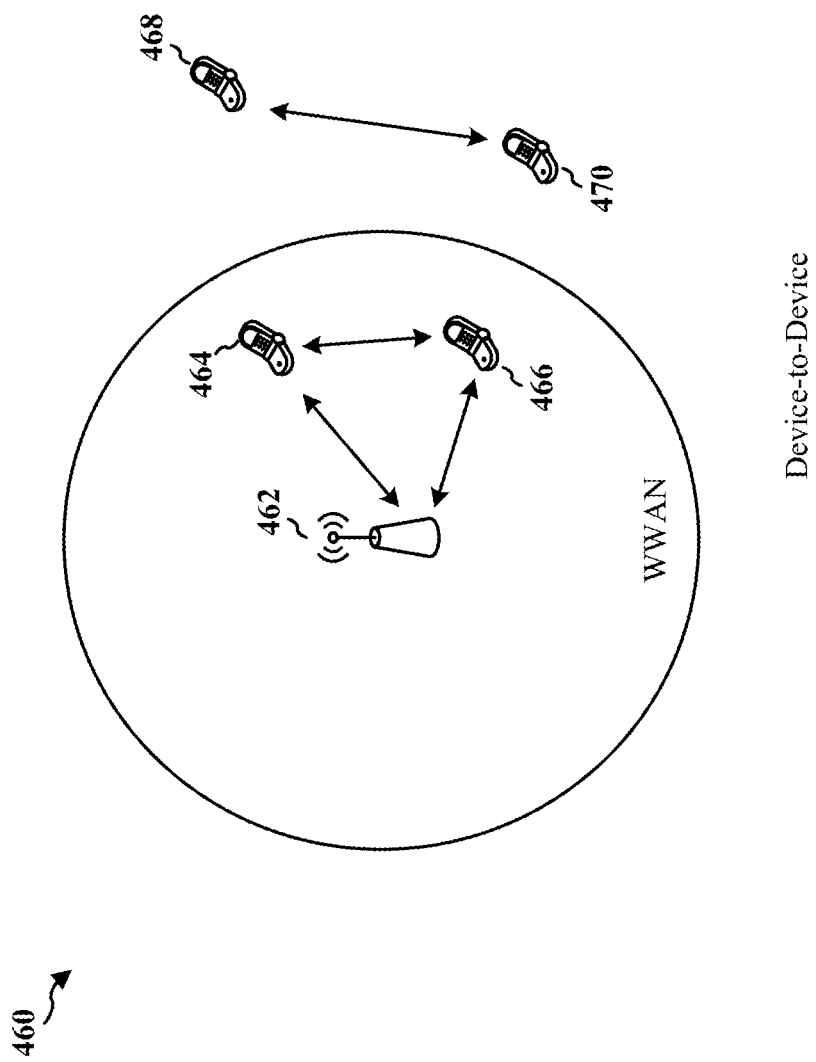
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

As discussed above, one UE may perform D2D communication with another UE via a D2D link between the UEs. The D2D link may be a PC5 link. It may be beneficial to measure a quality of the D2D link (e.g., D2D link strength) between the UEs for various situations. For example, a UE may measure qualities of the D2D links of proximate UEs that are near the UE to find a proximate UE having the best D2D link quality with the UE. The D2D link quality between UEs may be based on signal strength of communication between the UEs. The UE may connect to a proximate UE that provides the best D2D link quality with the UE, among the proximate UEs. Therefore, an effective approach to measure the D2D link quality between UEs is desired.

In one use case, a UE may be selected as a relay UE based on the D2D link quality. In particular, a UE that is out of coverage of a network or has a very weak connection to the network may be able to communicate with one or more UEs that are within the coverage of the network. The UE that is out of network coverage or has a very weak connection to the network may be referred to as a remote UE, hereinafter. The remote UE may be able to use another UE (e.g., a proximate UE) that is within the network coverage as a relay to communicate with the network. For example, the remote UE that is out of the network coverage may be able to communicate with a proximate UE that is within the network coverage, where the proximate UE within the network coverage performs a relay function for the remote UE such that the remote UE may communicate with the network via the proximate UE within the network. The communication between the remote UE and the proximate UE within the network coverage may be performed via D2D communication. There may be multiple available proximate UEs within the network coverage that may be candidates for a relay for the remote UE. The remote UE may select one of the proximate UEs within the network coverage as a relay to communicate with the network. Using a relay UE having a reliable connection with the remote UE is desired for communication with the network. Thus, the UE may select a proximate UE that provides the best D2D link quality with the UE, based on measurements of the D2D link qualities between the remote UE outside the network coverage and the proximate UEs within the network coverage.

Figure 5:
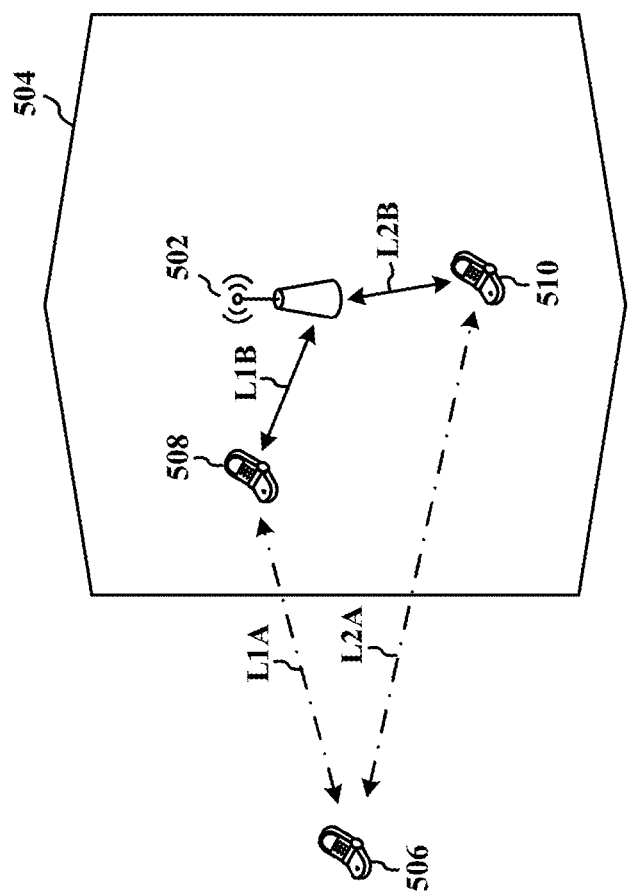
FIG. 5 is an example diagram illustrating communication between various UEs.

FIG. 5 is an example diagram 500 illustrating communication between various UEs. A base station 502 provides network coverage 504. A remote UE 506 is outside the network coverage 504, and thus cannot communicate with the base station 502. A proximate UE 508 and a proximate UE 510 are within the network coverage 504, and thus are capable of communicating with the base station 502. The remote UE 506 may communicate with the proximate UE 508 via a communication link L1A, and may communicate with the proximate UE 510 via a communication link L2A. L1A may be a D2D link between the remote UE 506 and the proximate UE 508, and L2A may be a D2D link between the remote UE 506 and the proximate UE 510. The proximate UE 508 may communicate with the base station 502 via a communication link L1B. The proximate UE 510 may communicate with the base station 502 via a communication link L2B. The remote UE 506 may communicate with the base station 502 via the proximate UE 508 performing as a relay for the remote UE 506, via the communication link L1A and the communication link L1B. The remote UE 506 may communicate with the base station 502 via the proximate 510 performing as a relay for the remote UE 506, via the communication link L2A and the communication link L2B. In one aspect, the remote UE 506 may measure D2D link qualities of the link L1A and L2A, and select one of the proximate UEs 508 and 510 as a relay UE based on the measurement of the D2D link qualities. For example, if the D2D link quality of the link L1A is better than the D2D link quality of the link L2A, the remote UE 506 may select the proximate UE 508 as a relay to communicate with the base station 502, via the link L1A and the link L1B.

According to a first approach of the disclosure, a UE may measure a quality of a D2D link with a proximate UE based on signal strength of a D2D discovery signal from the proximate UE. The proximate UE may regularly announce a D2D discovery signal. The UE may detect and receive the D2D discovery signal and may determine based on the D2D discovery signal that the proximate UE is available to establish a D2D connection. The proximate UE may transmit the D2D discovery signal on a physical sidelink discovery channel (PSDCH). In LTE, a UE may measure signal strength of a signal from a base station based on one or more reference signals received from the base station. In an aspect, in certain instances, in the D2D discovery, UEs may transmit identical reference signals for D2D discovery. More specifically, in the D2D discovery in such instances, because reference signals from different proximate UEs may be identical to each other, a UE may not be able to distinguish between a reference signal from one proximate UE and a reference signal from another proximate UE. In such instances, because the UE may not be able to determine which proximate UE the reference signals are from, even if the UE measures signal strength of a reference signal, the UE cannot determine which proximate UE corresponds to the signal strength of the reference signal. Therefore, in such instances, the UE may measure signal strength of the D2D discovery signal from a proximate UE based on a portion that is not a reference signal portion in the D2D discovery signal.

Therefore, according to the first approach of the disclosure, the UE may measure signal strength of the D2D discovery signal from a proximate UE (e.g., to determine a quality of a D2D link with the proximate UE) based on a reference signal portion in a D2D discovery signal and/or a portion that is not a reference signal portion in the D2D discovery signal. In an aspect, the UE may determine a quality of a D2D link with the proximate UE by measuring the signal strength of the D2D discovery signal based on the reference signal portion and/or the data portion of the D2D discovery signal from a proximate UE. In particular, to measure the signal strength of the D2D discovery signal from a proximate UE, the UE may be configured to measure signal strength on resource elements used for communication of the reference signal portion and/or resource elements used for communication of the data portion of the D2D discovery signal. In certain instances, if the signal strength is measured based on the data portion of the D2D discovery signal, because data sent from a proximate UE is specific to the proximate UE, the UE can distinguish between a data portion sent from one proximate UE and a data portion sent from another proximate UE. In an aspect, the UE may measure the signal strength on resource elements used for communication of the data portion of the D2D discovery signal by measuring reference signal received power (RSRP) and/or reference signal received quality (RSRQ) over the resource elements used for communication of the data portion of the D2D discovery signal. In an aspect, the UE may measure the signal strength on resource elements used for communication of the reference signal portion of the D2D discovery signal by measuring RSRP and/or RSRQ over the resource elements used for communication of the reference signal portion of the D2D discovery signal.

In an example use case, a proximate UE that is within the network coverage may announce a D2D discovery signal that indicates that the proximate UE is available to perform as a relay to communicate with the network. A remote UE that is outside the network coverage may receive the D2D discovery signal sent from the proximate UE. The remote UE may receive D2D discovery signals from different proximate UEs. The remote UE may determine a D2D link quality with each proximate UE based on the signal strength of a respective D2D discovery signal, where the signal strength of a D2D discovery signal is measured based on signal strength of resource elements used for communication of a reference signal portion of the D2D discovery signal and/or signal strength of resource elements used for communication of a data portion of the D2D discovery signal, as discussed above. Subsequently, the remote UE may select a proximate UE with the best D2D link quality (e.g., highest D2D discovery signal strength) as a relay UE via which the remote UE may communicate to the network.

For example, referring to FIG. 5, the proximate UE 508 may transmit a D2D discovery signal and the proximate UE 510 may transmit a D2D discovery signal. The remote UE 506 measures signal strength of the D2D discovery signal from the proximate UE 508 to determine the quality of the communication link (e.g., D2D link) L1A. The remote UE 506 also measures signal strength of the D2D discovery signal from the proximate UE 510 to determine the quality of the communication link (e.g., D2D link) L2A. The remote UE 506 selects one of the proximate UEs 508 and 510 based on the signal strength of the communication link L1A and the signal strength of the communication link L2A. The remote UE 506 selects the proximate UE that provides the highest signal strength of the communication link. For example, if the signal strength of the communication link L1A is greater than the signal strength of other communication links (e.g., L2A), the remote UE 506 selects the proximate UE 508 as a relay.

According to a second approach of the disclosure, a UE may measure a quality of a D2D link with a proximate UE based on D2D communication from the proximate UE. In a D2D communication signal, there is a control part and a traffic part for the D2D communication. The UE may receive the control part on a physical sidelink control channel (PSCCH), and may receive the traffic part on a physical sidelink shared channel (PSSCH). Compared to the control part, the traffic part is transmitted over more resources that are spread more over time and frequency. For example, the control part is generally transmitted on a single resource block, whereas the traffic part is generally transmitted on more than one resource block. Further, the control part is transmitted less frequently than the traffic part. Hence, the traffic part provides more information to measure the quality of the D2D link than the traffic part does, and thus may provide more accurate measurement of the quality of the D2D link. For this reason, the UE according to the second approach measures a quality of a D2D link based on the traffic part of the D2D communication signal.

The traffic part of the D2D communication signal includes a reference signal portion and a data portion. In an aspect of the second approach, the UE may measure signal strength of the data portion and/or signal strength of the reference signal portion. The UE may determine signal strength of the D2D communication signal based on the signal strength of the reference signal portion and/or the signal strength of the data portion, in order to determine the quality of the D2D link. In the D2D communication, a reference signal from one proximate UE may be distinguishable from another reference signal from another proximate UE, depending on one or more conditions. For example, if different proximate UEs transmit different sequences (e.g., Zadoff-Chu sequences) that are used for transmission of reference signals, the UE may be able to distinguish reference signals from different proximate UEs by distinguishing different sequences. However, a number of different sequences is generally limited. Thus, if a number of proximate UEs is greater than a number of different sequences, not all reference signals may be distinguishable based on the sequences. For example, if there are five different Zadoff-Chu sequences, and there are 20 reference signals from 20 different proximate UEs, the UE may not be able to completely distinguish all 20 different proximate UEs based on five different Zadoff-Chu sequences.

On the contrary, the UE may distinguish data portions from different proximate UEs regardless of the number of proximate UEs. Because data sent from a proximate UE is specific to the proximate UE, the UE can distinguish between a data portion sent from one proximate UE and a data portion sent from another proximate UE, regardless of a number of proximate UEs. Therefore, in an aspect of the second approach, it may be preferred that the measurement of signal strength of the D2D communication signal is at least in part based on signal strength of the resource elements used for communication of the data portion. In another aspect, the measurement of signal strength of the D2D communication signal may be based on signal strength of the resource elements used for the data portion as well as signal strength of resource elements used for the reference signal portion. In an aspect, the UE may measure the signal strength of the resource elements used for communication of the data portion of the D2D communication signal by measuring RSRP and/or RSRQ over the resource elements used for communication of the data portion. In an aspect, the UE may measure the signal strength of the resource elements used for communication of the reference signal portion of the D2D communication signal by measuring RSRP and/or RSRQ over the resource elements used for communication of the reference signal portion.

In an example use case, a proximate UE that is within network coverage may announce the D2D communication signal that indicates that the proximate UE is available to perform as a relay to communicate with the network. A remote UE that is outside the network coverage may receive the D2D communication signal. The remote UE may receive D2D communication signals from different proximate UEs. The remote UE may determine D2D link quality with each proximate UE based on the traffic part of a respective D2D communication signal, where the traffic part includes a reference signal portion and a data portion. In particular, the remote UE may determine the D2D link quality based on signal strength of a reference signal portion and/or signal strength of a data portion of the respective D2D communication signal. The signal strength of the reference signal portion is measured on resource elements used for transmission of one or more reference signals of the D2D communication signal, as discussed above. The signal strength of the data portion is measured on resource elements used for transmission of the data portion of the D2D communication signal, as discussed above. Subsequently, the remote UE may select a proximate UE with the best D2D link quality (e.g., highest D2D communication signal strength) as a relay UE via which the remote UE may communicate to the network.

For example, referring to FIG. 5, the proximate UE 508 may transmit a D2D communication signal and the proximate UE 510 may transmit a D2D communication signal. The remote UE 506 measures signal strength of the D2D communication signal from the proximate UE 508 to determine the quality of the communication link (e.g., D2D link) L1A. The remote UE 506 also measures signal strength of the D2D communication signal from the proximate UE 510 to determine the quality of the communication link (e.g., D2D link) L2A. The remote UE 506 selects one of the proximate UEs 508 and 510 based on the signal strength of the communication link L1A and the signal strength of the communication link L2A. If the signal strength of the communication link L1A is greater than the signal strength of other communication links (e.g., L2A), the remote UE 506 selects the proximate UE 508 as a relay.

Figure 6:
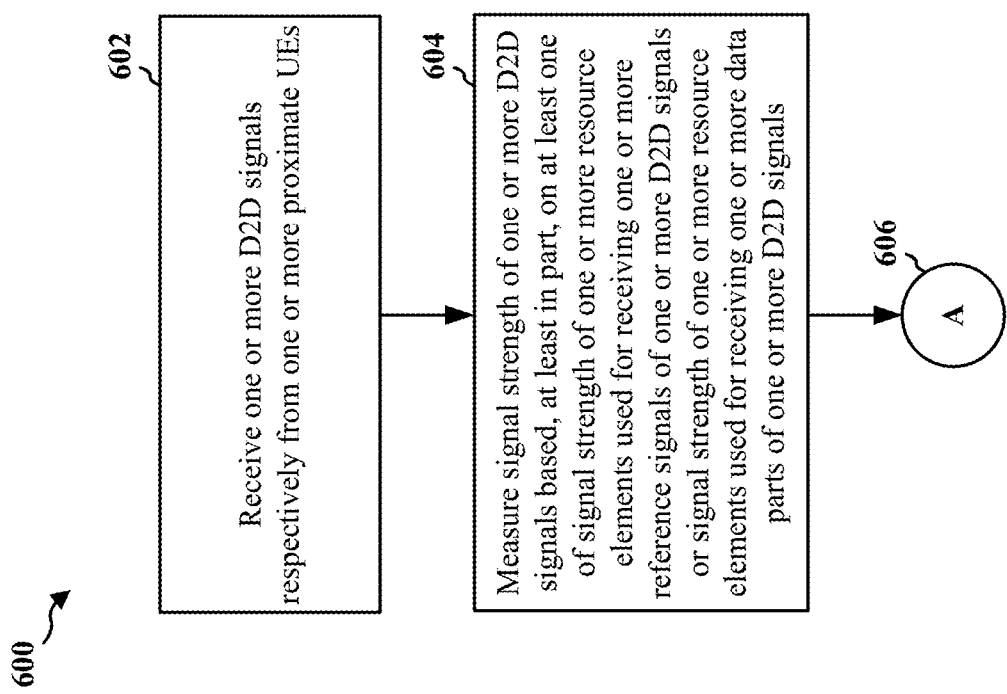
FIG. 6 is a flowchart of a method of wireless communication.

FIG. 6 is a flowchart 600 of a method of wireless communication. The method may be performed by a UE (e.g., the UE 104, the UE 506, the apparatus 802/802'). At 602, the UE receives one or more D2D signals respectively from one or more proximate UEs. At 604, the UE measures signal strength of the one or more D2D signals based, at least in part, on at least one of signal strength of one or more resource elements used for receiving one or more reference signals of the one or more D2D signals or signal strength of one or more resource elements used for receiving one or more data parts of the one or more D2D signals. At 606, the UE may perform additional steps, as discussed infra. In an aspect, the UE is out of coverage of any base station. In an aspect, the signal strength of the one or more resource elements used for receiving the one or more data parts of the one or more D2D signals is based on at least one of RSRP or RSRQ of the one or more resource elements used for receiving the one or more data parts of the one or more D2D signals.

For example, as discussed supra, to measure the signal strength of the D2D discovery signal, the UE may be configured to measure signal strength on resource elements used for communication of the reference signal portion and/or resource elements used for communication of the data portion of the D2D discovery signal. For example, as discussed supra, the measurement of signal strength of the D2D communication signal is at least in part based on signal strength of the resource elements used for communication of the reference signal portion and/or signal strength of the resource elements used for communication of the data portion. For example, as discussed supra, the UE may measure the signal strength on resource elements used for communication of the data portion of the D2D discovery signal by measuring RSRP and/or RSRQ over the resource elements used for communication of the data portion of the D2D discovery signal. For example, as discussed supra, the UE may measure the signal strength on resource elements used for communication of the reference signal portion of the D2D discovery signal by measuring RSRP and/or RSRQ over the resource elements used for communication of the reference signal portion of the D2D discovery signal. For example, as discussed supra, the UE may measure the signal strength of the resource elements used for communication of the data portion of the D2D communication signal by measuring RSRP and/or RSRQ over the resource elements used for communication of the data portion. For example, as discussed supra, the UE may measure the signal strength of the resource elements used for communication of the reference signal portion of the D2D communication signal by measuring RSRP and/or RSRQ over the resource elements used for communication of the reference signal portion.

In an aspect, each of the one or more D2D signals may be included in a corresponding D2D discovery signal. In such an aspect, the corresponding D2D discovery signal may be received on a PSDCH. For example, as discussed supra, a UE may measure a quality of a D2D link with a proximate UE based on signal strength of a D2D discovery signal from the proximate UE. For example, as discussed supra, the proximate UE may transmit the D2D discovery signal on a PSDCH.

In an aspect, each of the one or more D2D signals may be included in a corresponding D2D communication signal. In such an aspect, the one or more data portions and the one or more reference signals of the one or more D2D signals are received on a PSSCH. In such an aspect, the one or more control signals of the one or more D2D signals are received on a PSCCH. For example, as discussed supra, a UE may measure a quality of a D2D link with a proximate UE based on D2D communication from the proximate UE. For example, as discussed supra, the UE may determine signal strength of the D2D communication signal based on the signal strength of the reference signal portion and/or the signal strength of the data portion, in order to determine the quality of the D2D link. For example, as discussed supra, the UE may receive the control part on a PSCCH, and may receive the traffic part on a PSSCH.

Figure 7:
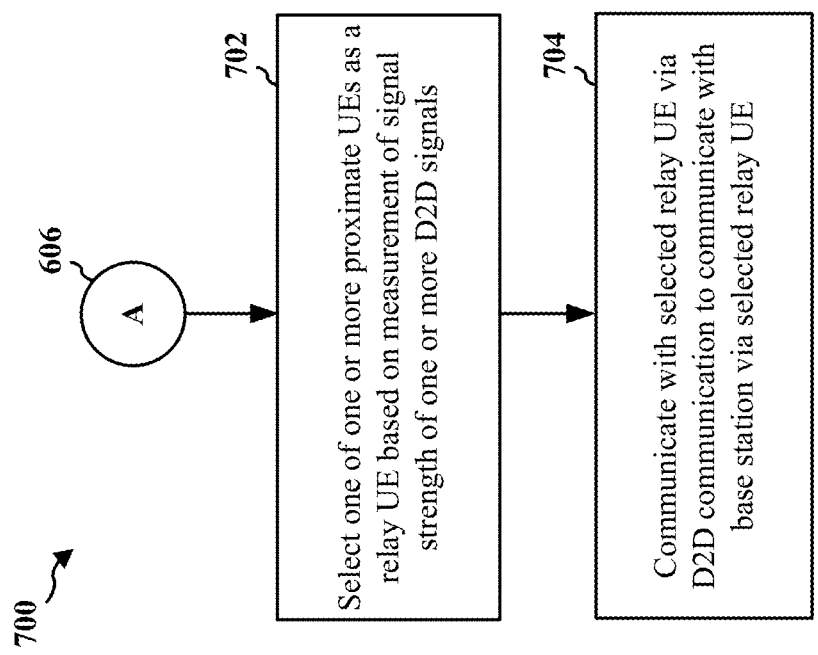
FIG. 7 is a flowchart of a method of wireless communication, expanding from the flowchart of FIG. 6.

FIG. 7 is a flowchart 700 of a method of wireless communication, expanding from the flowchart 600 of FIG. 6. The method may be performed by a UE (e.g., the UE 104, the UE 506, the apparatus 802/802'). At 606, the method continues from the flowchart 600 of FIG. 6. At 702, the UE selects one of the one or more proximate UEs as a relay UE based on the measurement of the signal strength of the one or more D2D signals. At 704, the UE communicates with the selected relay UE via D2D communication to communicate with the base station via the selected relay UE. For example, as discussed supra, the remote UE may select a proximate UE with the best D2D link quality (e.g., highest D2D discovery signal strength) as a relay UE via which the remote UE may communicate to the network. For example, as discussed supra, the remote UE may select a proximate UE with the best D2D link quality (e.g., highest D2D communication signal strength) as a relay UE via which the remote UE may communicate to the network.

Figure 8:
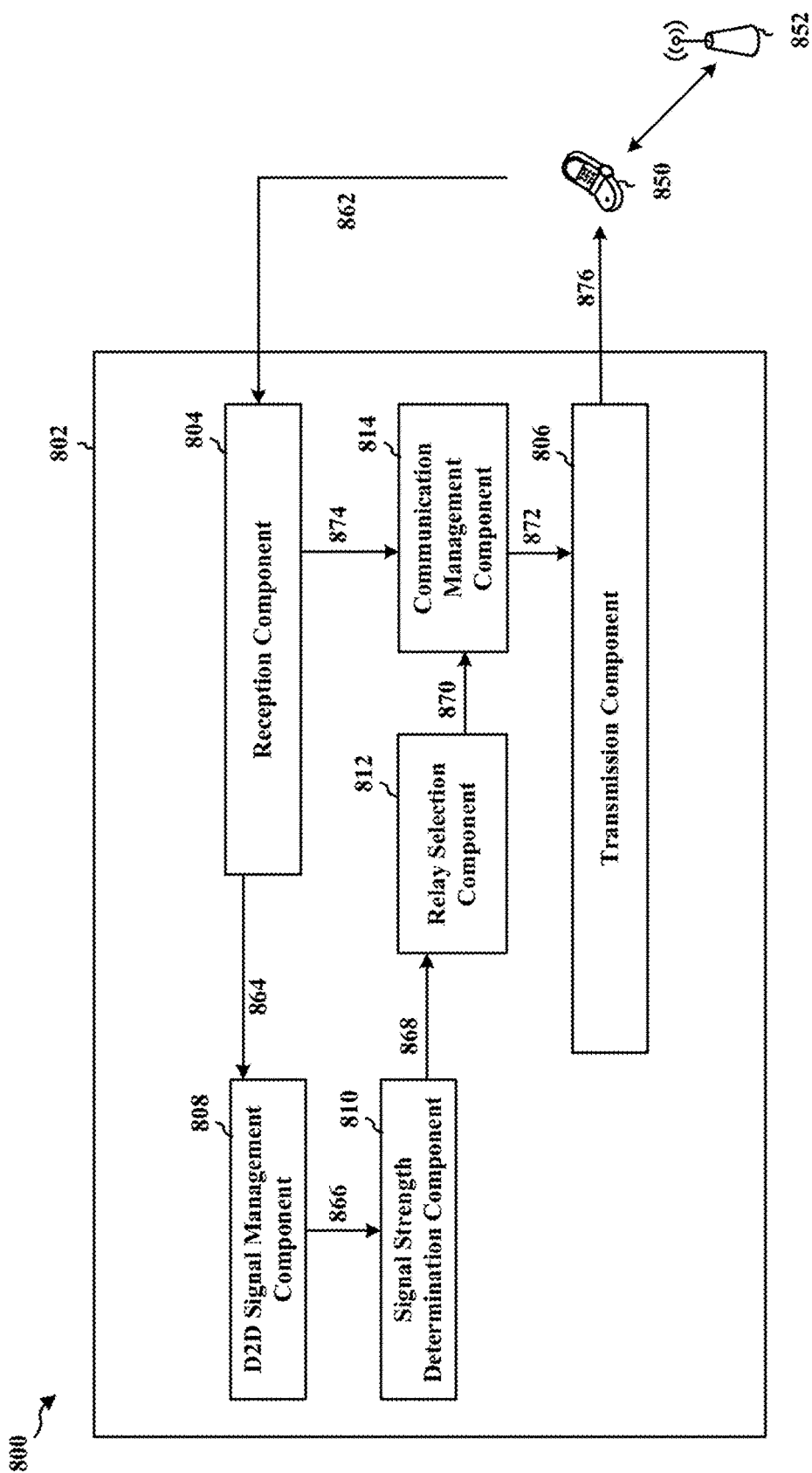
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE. The apparatus includes a reception component 804, a transmission component 806, a D2D signal management component 808, a signal strength determination component 810, a relay selection component 812, and a communication management component 814.

The D2D signal management component 804 receives, via 862 and 864 using the reception component 804, one or more D2D signals respectively from one or more proximate UEs (e.g., a proximate UE 850). The signal strength determination component 814 measures signal strength of the one or more D2D signals (e.g., received from the D2D signal management component 804 via 866) based, at least in part, on at least one of signal strength of one or more resource elements used for receiving one or more reference signals of the one or more D2D signals or signal strength of one or more resource elements used for receiving one or more data parts of the one or more D2D signals. In an aspect, the UE 802 may be out of coverage of any base station. In an aspect, the signal strength of the one or more resource elements used for receiving the one or more data parts of the one or more D2D signals is based on at least one of RSRP or RSRQ of the one or more resource elements used for receiving the one or more data parts of the one or more D2D signals.

In an aspect, each of the one or more D2D signals may be included in a corresponding D2D discovery signal. In such an aspect, the corresponding D2D discovery signal may be received on a PSDCH.

In an aspect, each of the one or more D2D signals may be included in a corresponding D2D communication signal. In such an aspect, the one or more data portions and the one or more reference signals of the one or more D2D signals are received on a PSSCH. In such an aspect, the one or more control signals of the one or more D2D signals are received on a PSCCH.

In an aspect, the relay selection component 812 may select one of the one or more proximate UEs as a relay UE based on the measurement of the signal strength of the one or more D2D signals (e.g., measurement received from the signal strength determination component 810 via 868). The communication management component 814 communicates with the selected relay UE (e.g., UE 850) via D2D communication to communicate with a base station (e.g., base station 852) via the selected relay UE (e.g., based on information on the selected relay UE received from the relay selection component 812 via 870). The communication management component 814 may communicate with the selected relay UE via 862 and 874 using the reception component 804, and via 872 and 876 using the transmission component 806. In an aspect, each of the one or more D2D signals may indicate that a corresponding proximate UE is available as a relay used to communicate with the base station (e.g., base station 852).

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
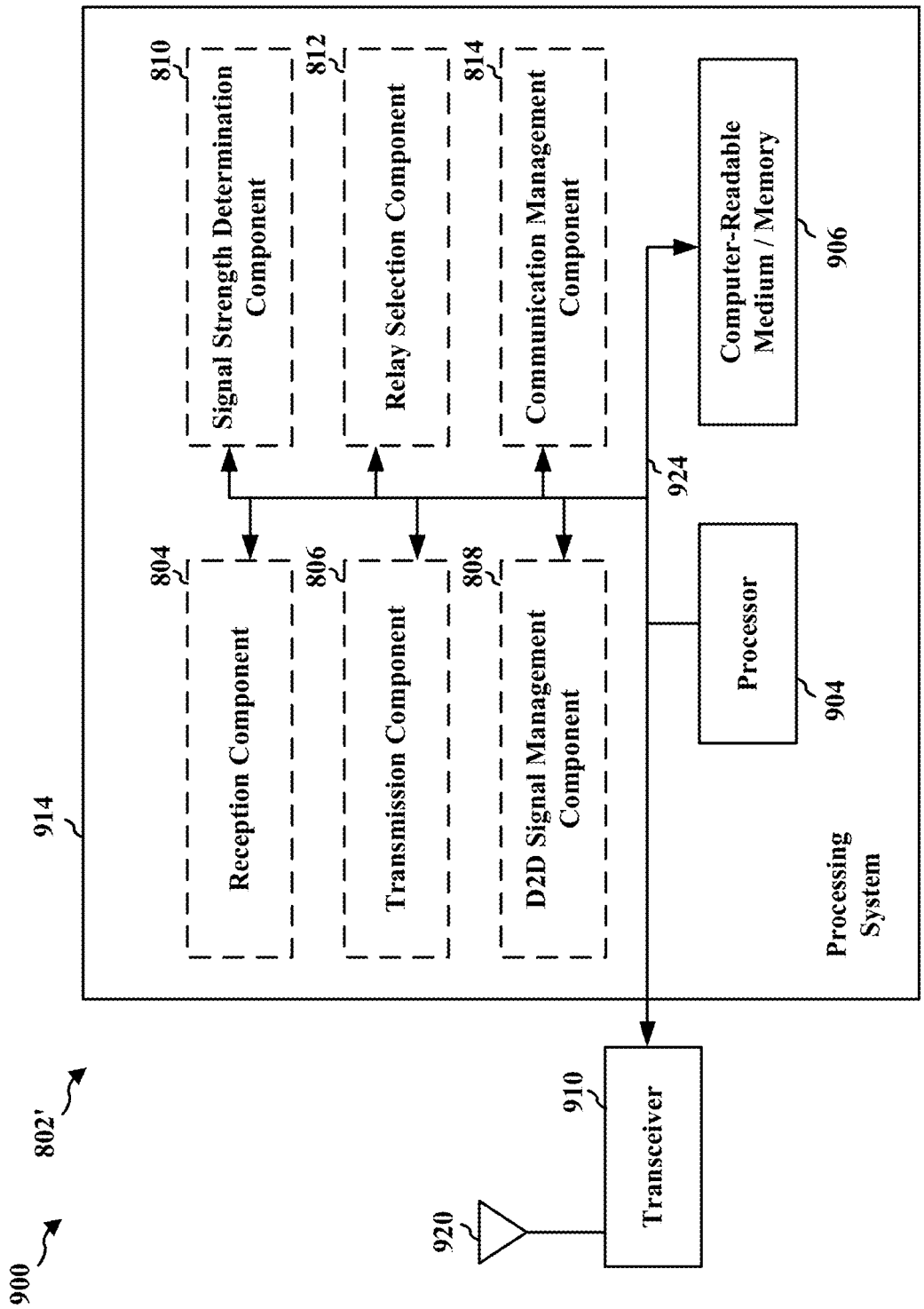
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for receiving one or more D2D signals respectively from one or more proximate UEs, and means for measuring signal strength of the one or more D2D signals based, at least in part, on at least one of signal strength of one or more resource elements used for receiving one or more reference signals of the one or more D2D signals or signal strength of one or more resource elements used for receiving one or more data parts of the one or more D2D signals. In an aspect, the apparatus 802/802' includes means for selecting one of the one or more proximate UEs as a relay UE based on the measurement of the signal strength of the one or more D2D signals, and means for communicating with the selected relay UE via D2D communication to communicate with the base station via the selected relay UE. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
   receiving one or more device-to-device (D2D) signals respectively from one or more proximate UEs; and
   measuring signal strength of the one or more D2D signals based, at least in part, on at least one of signal strength of one or more resource elements used for receiving one or more traffic portions of the one or more D2D signals or signal strength of one or more resource elements used for receiving one or more data parts of the one or more D2D signals.

2. The method of claim 1, further comprising:
   selecting one of the one or more proximate UEs as a relay UE based on the measurement of the signal strength of the one or more D2D signals; and
   communicating with the selected relay UE via D2D communication to communicate with a base station via the selected relay UE.

3. The method of claim 2, wherein each of the one or more D2D signals indicates that a corresponding proximate UE is available as a relay used to communicate with the base station.

4. The method of claim 1, wherein each of the one or more D2D signals is included in a corresponding D2D discovery signal.

5. The method of claim 4, wherein the corresponding D2D discovery signal is received on a physical sidelink discovery channel (PSDCH).

6. The method of claim 1, wherein each of the one or more D2D signals is included in a corresponding D2D communication signal.

7. The method of claim 6, wherein the one or more traffic portions including one or more data portions and one or more reference signal portions are received on a physical sidelink shared channel (PSSCH).

8. The method of claim 6, wherein one or more control portions of the one or more D2D signals are received on a physical sidelink control channel (PSCCH).

9. The method of claim 1, wherein the UE is out of coverage of any base station.

10. The method of claim 1, wherein the signal strength of the one or more resource elements used for receiving the one or more data parts of the one or more D2D signals is based on at least one of reference signal received power (RSRP) or reference signal received quality (RSRQ) of the one or more resource elements used for receiving the one or more data parts of the one or more D2D signals.

11. A user equipment (UE) for wireless communication, comprising:
 means for receiving one or more device-to-device (D2D) signals respectively from one or more proximate UEs; and
 means for measuring signal strength of the one or more D2D signals based, at least in part, on at least one of signal strength of one or more resource elements used for receiving one or more traffic portions of the one or more D2D signals or signal strength of one or more resource elements used for receiving one or more data parts of the one or more D2D signals.

12. The UE of claim 11, further comprising:
 means for selecting one of the one or more proximate UEs as a relay UE based on the measurement of the signal strength of the one or more D2D signals; and
 means for communicating with the selected relay UE via D2D communication to communicate with a base station via the selected relay UE.

13. The UE of claim 12, wherein each of the one or more D2D signals indicates that a corresponding proximate UE is available as a relay used to communicate with the base station.

14. The UE of claim 11, wherein each of the one or more D2D signals is included in a corresponding D2D discovery signal.

15. The UE of claim 14, wherein the corresponding D2D discovery signal is received on a physical sidelink discovery channel (PSDCH).

16. The UE of claim 11, wherein each of the one or more D2D signals is included in a corresponding D2D communication signal.

17. The UE of claim 16, wherein the one or more traffic portions including one or more data portions and one or more reference signal portions are received on a physical sidelink shared channel (PSSCH).

18. The UE of claim 16, wherein one or more control portions of the one or more D2D signals are received on a physical sidelink control channel (PSCCH).

19. The UE of claim 11, wherein the UE is out of coverage of any base station.

20. The UE of claim 11, wherein the signal strength of the one or more resource elements used for receiving the one or more data parts of the one or more D2D signals is based on at least one of reference signal received power (RSRP) or reference signal received quality (RSRQ) of the one or more resource elements used for receiving the one or more data parts of the one or more D2D signals.

21. A user equipment (UE) for wireless communication, comprising:
 a memory; and
 at least one processor coupled to the memory and configured to:
  receive one or more device-to-device (D2D) signals respectively from one or more proximate UEs; and
  measure signal strength of the one or more D2D signals based, at least in part, on
 at least one of signal strength of one or more resource elements used for receiving one or more traffic portions of the one or more D2D signals or signal strength of one or more resource elements used for receiving one or more data parts of the one or more D2D signals.

22. The UE of claim 21, wherein at least one processor is further configured to:
 select one of the one or more proximate UEs as a relay UE based on the measurement of the signal strength of the one or more D2D signals; and
 communicate with the selected relay UE via D2D communication to communicate with a base station via the selected relay UE.

23. The UE of claim 22, wherein each of the one or more D2D signals indicates that a corresponding proximate UE is available as a relay used to communicate with the base station.

24. The UE of claim 21, wherein each of the one or more D2D signals is included in a corresponding D2D discovery signal.

25. The UE of claim 24, wherein the corresponding D2D discovery signal is received on a physical sidelink discovery channel (PSDCH).

26. The UE of claim 21, wherein each of the one or more D2D signals is included in a corresponding D2D communication signal.

27. The UE of claim 26, wherein the one or more traffic portions including one or more data portions and one or more reference signal portions are received on a physical sidelink shared channel (PSSCH).

28. The UE of claim 26, wherein one or more control portions of the one or more D2D signals are received on a physical sidelink control channel (PSCCH).

29. The UE of claim 21, wherein the signal strength of the one or more resource elements used for receiving the one or more data parts of the one or more D2D signals is based on at least one of reference signal received power (RSRP) or reference signal received quality (RSRQ) of the one or more resource elements used for receiving the one or more data parts of the one or more D2D signals.

30. A non-transitory computer-readable medium storing computer executable code for wireless communication, comprising code to:
 receive one or more device-to-device (D2D) signals respectively from one or more proximate UEs; and
 measure signal strength of the one or more D2D signals based, at least in part, on at least one of signal strength of one or more resource elements used for receiving one or more traffic portions of the one or more D2D signals or signal strength of one or more resource elements used for receiving one or more data parts of the one or more D2D signals.

* * * * *